(12) United States Patent
Bang et al.

(10) Patent No.: US 11,614,842 B2
(45) Date of Patent: Mar. 28, 2023

(54) ELECTRONIC DEVICE COMPRISING A DISPLAY PANEL AND AN INPUT SENSOR ON THE DISPLAY PANEL

(71) Applicant: Samsung Display Co., Ltd., Yongin-si (KR)

(72) Inventors: Gyeongnam Bang, Seoul (KR); Deokjung Kim, Cheonansi (KR); Eunyoung Kim, Asan-si (KR); Hyeyun Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/364,499

(22) Filed: Jun. 30, 2021

(65) Prior Publication Data

US 2022/0107707 A1 Apr. 7, 2022

(30) Foreign Application Priority Data

Oct. 5, 2020 (KR) .......................... 10-2020-0128294

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0445* (2019.05)

(58) Field of Classification Search
CPC .. G06F 3/04166; G06F 3/0446; G06F 3/0412; G06F 3/0445; G06F 3/0448; G06F 2203/04111; G06F 3/04164
See application file for complete search history.

(56) References Cited

U.S. PATENT DOCUMENTS

| | | | |
|---|---|---|---|
| 10,514,800 B2 | 12/2019 | Jo et al. | |
| 10,795,522 B2 | 10/2020 | Mugiraneza et al. | |
| 2011/0216032 A1* | 9/2011 | Oda | G06F 3/0446 345/174 |
| 2020/0042118 A1 | 2/2020 | Mugiraneza et al. | |
| 2020/0089369 A1 | 3/2020 | Bang et al. | |
| 2021/0200404 A1* | 7/2021 | Kim | G06F 3/0412 |

FOREIGN PATENT DOCUMENTS

KR 10-2017-0056798 A 5/2017

* cited by examiner

*Primary Examiner* — Deeprose Subedi
(74) *Attorney, Agent, or Firm* — Lewis Roca Rothgerber Christie LLP

(57) ABSTRACT

An electronic device, includes: a display panel; and an input sensor on the display panel, wherein the input sensor is configured to operate in a first mode during which the input sensor detects a first input from a user's touch or in a second mode during which the input sensor detects a second input from an input apparatus, wherein the input sensor includes: a first sensing part configured to detect the first input and the second input; and a second sensing part configured to recognize the input apparatus.

18 Claims, 12 Drawing Sheets

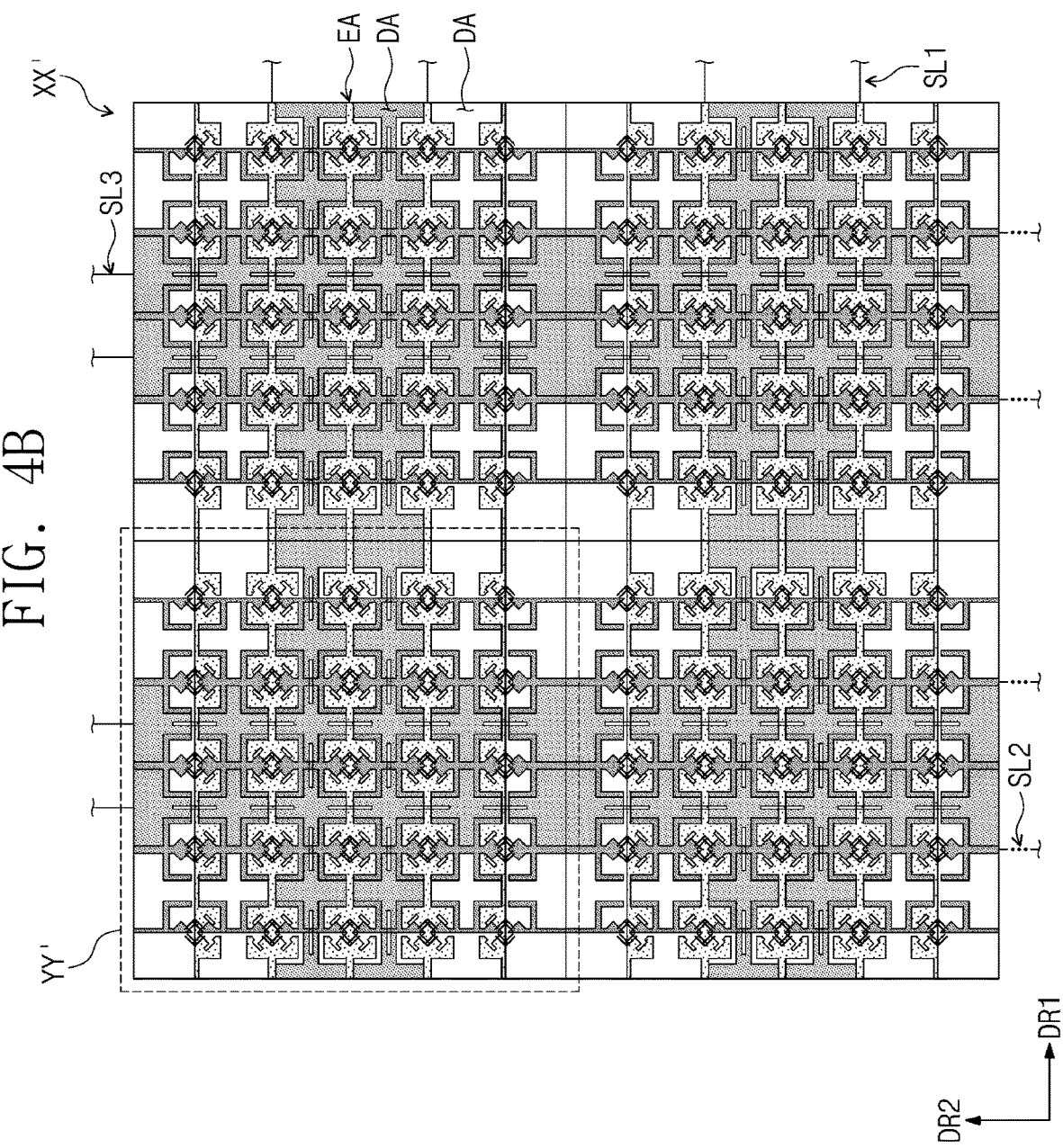

ELECTRONIC DEVICE COMPRISING A DISPLAY PANEL AND AN INPUT SENSOR ON THE DISPLAY PANEL

CROSS-REFERENCE TO RELATED APPLICATION

The present application claims priority to and the benefit of Korean Patent Application No. 10-2020-0128294 filed on Oct. 5, 2020 in the Korean Intellectual Property Office, the entire content of which is hereby incorporated by reference.

BACKGROUND

1. Field

Aspects of some embodiments of the present invention relate to an electronic device.

2. Description of Related Art

An electronic device may detect an external input that is externally applied from an external source outside the electronic device. The external input may be, for example, a user's input. The user's input may include a user's touch input, for example, from a body part, light, heat, pen, pressure, or various other types of external input. The electronic device may use electromagnetic resonance (EMR) or active electrostatic (AES) to recognize coordinate information of a pen.

The above information disclosed in this Background section is only for enhancement of understanding of the background and therefore the information discussed in this Background section does not necessarily constitute prior art.

SUMMARY

Aspects of some embodiments of the present invention relate to an electronic device, and for example, to an electronic device with relatively improved detection reliability.

Aspects of some embodiments of the present invention include an electronic device with relatively improved detection reliability.

Aspects of some embodiments of the present invention include an electronic device in which an active-pen sensing electrode and a touch sensing electrode are individually separated from each other to reduce noise and to increase detection sensitivity.

According to some embodiments of the present invention, an electronic device includes: a display panel; and an input sensor on the display panel, the input sensor operating under a first mode which detects a first input from a user's touch or under a second mode which detects a second input from an input apparatus. The input sensor may include: a first sensing part which detects the first input and the second input; and a second sensing part which recognizes the input apparatus.

According to some embodiments, the input sensor may operate under the second mode when the second sensing part recognizes the input apparatus.

According to some embodiments, the first sensing part may include: a plurality of first sensing electrodes which are arranged in a first direction and each of which extends in a second direction intersecting the first direction; and a plurality of second sensing electrodes which are arranged in the second direction and each of which extends in the first direction.

According to some embodiments, the second sensing part may include: a plurality of third sensing electrodes each of between two neighboring ones of the plurality of first sensing electrodes and between two neighboring ones of the plurality of second sensing electrodes; and a plurality of bridge electrodes which connect the plurality of third sensing electrodes to each other.

According to some embodiments, the input sensor may include: an active area where the first and second sensing parts are located; and a peripheral area adjacent to the active area and where a plurality of wiring lines are located. The active area may include: a first region where the first sensing electrodes and the second sensing electrodes are located; and a second region adjacent to the first region and where a plurality of dummy electrodes are located.

According to some embodiments, the third sensing electrodes may be located on a part of the second region. None of the dummy electrodes may be located on the part of the second region.

According to some embodiments, the input sensor may further include an input driving circuit which provides the first sensing part with a first signal to detect the first input or the second input and which provides the second sensing part with a second signal to recognize the input apparatus.

According to some embodiments, the input sensor may transmit the second signal to the input apparatus. The second signal may be regarded as an uplink signal.

According to some embodiments, the first signal may include a downlink signal which is received from the input apparatus to detect the second input.

According to some embodiments, the first sensing electrode, the second sensing electrode, and the third sensing electrode may be on the same layer. The bridge electrodes may be on a layer different from the layer on which the first, second, and third sensing electrodes are located.

According to some embodiments, the second sensing part may further include a plurality of auxiliary electrodes which overlap the third sensing electrodes and are on the same layer on which the bridge electrodes are located.

According to some embodiments, the input sensor may provide the plurality of auxiliary electrodes with a signal whose phase is opposite to a phase of a signal applied to the third sensing electrodes.

According to some embodiments, the plurality of auxiliary electrodes may overlap not only the third sensing electrodes but also at least ones of the first sensing electrodes and the second sensing electrodes.

According to some embodiments, the input sensor may further include: a first wiring line connected to the first sensing electrode; a second wiring line connected to the second sensing electrode; and a third wiring line connected to the third sensing electrode.

According to some embodiments, the input sensor may further include a plurality of auxiliary wiring lines which connect the auxiliary electrodes to an input driving circuit.

According to some embodiments of the present invention, an electronic device may comprise: a display panel; and an input sensor on the display panel, the input sensor including a sensing region and a dummy region adjacent to the sensing region, the sensing region including a first sensing part, and the dummy region including a second sensing part. The first sensing part may include a first sensing electrode and a second sensing electrode which are provided with a first signal to detect an input from an input apparatus or a user's touch. The second sensing part may include a third sensing electrode which is provided with a second signal to recognize the input apparatus. The first sensing electrode and the second sensing electrode may intersect each other on a plane. The third sensing electrode may be adjacent to the first sensing electrode and the second sensing electrode.

According to some embodiments, the input sensor may operate under a first mode which detects a first input from the user's touch or under a second mode which detects a second input from the input apparatus. The second mode may be activated when the input apparatus is recognized by the second signal of the third sensing electrode.

According to some embodiments, the first sensing electrode may be provided in plural. Each of the plurality of first sensing electrodes may extend in a first direction. The second sensing electrode may be provided in plural. Each of the plurality of second sensing electrodes may extend in a second direction. The third sensing electrode may be provided in plural. Each of the plurality of third sensing electrodes may be between two neighboring ones of the plurality of first sensing electrodes and between two neighboring ones of the plurality of second sensing electrodes.

According to some embodiments, the second sensing part may further include a bridge electrode on a layer different from a layer on which the third sensing electrode is located.

According to some embodiments, the input sensor may further include an auxiliary electrode which overlaps at least the third sensing electrode and which is located on the same layer on which the bridge electrode is located.

BRIEF DESCRIPTION OF THE DRAWINGS

FIGS. 4A and 4B illustrate plan views showing an electronic device according to some embodiments of the present invention.

DETAILED DESCRIPTION

Figure 1:
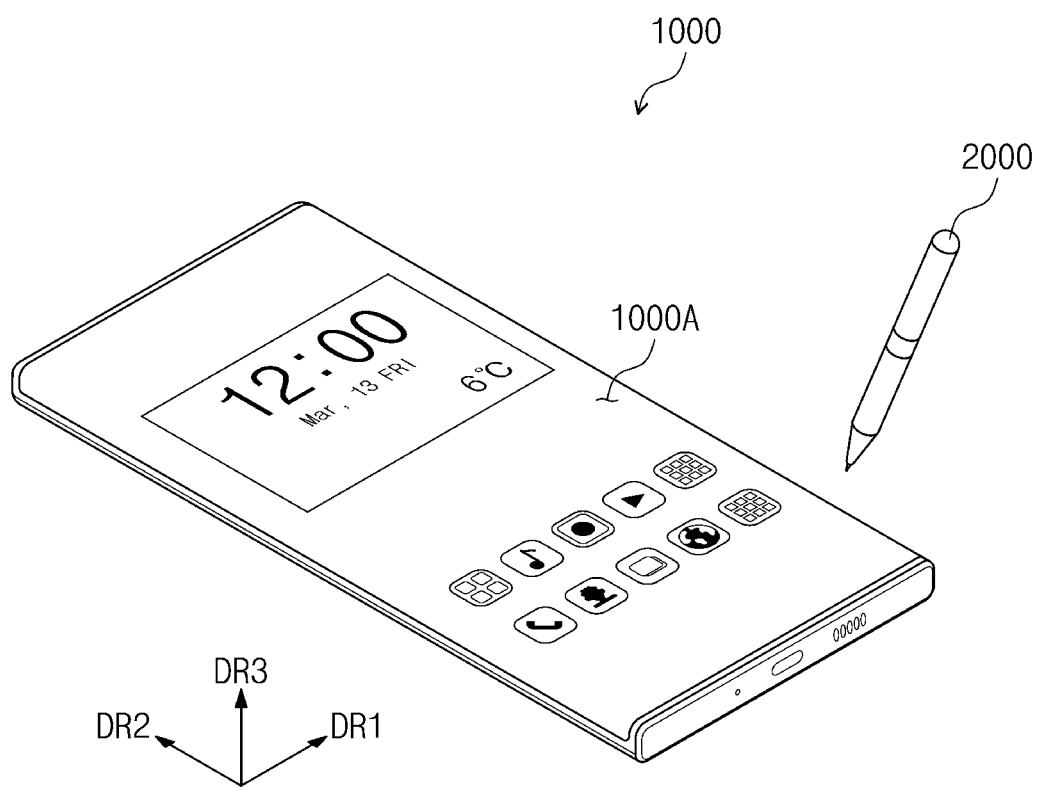
FIG. 1 illustrates a perspective view showing an electronic device according to some embodiments of the present invention.

In this description, when a certain component (or region, layer, portion, etc.) is referred to as being "on", "connected to", or "coupled to" other component(s), the certain component may be directly located on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents. The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the present invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

The following will now describe some embodiments of the present invention in conjunction with the accompanying drawings.

FIG. 1 illustrates a perspective view showing an electronic device according to some embodiments of the present invention.

Referring to FIG. 1, an electronic device 1000 may be an apparatus that is activated with an electronic signal. For example, the electronic device 1000 may be a mobile phone, a tablet computer, an automotive navigation system, a game console, or a wearable apparatus, but embodiments according to the present invention are not limited thereto. FIG. 1 depicts by way of example a mobile phone as the electronic device 1000.

The electronic device 1000 may display images at an active region 1000A. The active region 1000A may include a plane (e.g., a primary display surface, or a display surface) defined by a first direction DR1 and a second direction DR2. A thickness direction of the electronic device 1000 may be parallel to a third direction DR3 that intersects the first direction DR1 and the second direction DR2. The third direction DR3 may be used as a reference to define front and rear surfaces (or top and bottom surfaces) of each of members that constitute the electronic device 1000.

The electronic device 1000 may detect inputs that are externally applied from outside the electronic device 1000. The external input may be a user's input (e.g., a touch input).

The external input may include a user's body part, light, heat, pressure, or any various type inputs.

The electronic device 1000 shown in FIG. 1 may detect an input (a first input) from a user's touch and an input (a second input) from an input apparatus 2000. The input apparatus 2000 may include an apparatus other than a user's body. For example, the input apparatus 2000 may be an active pen or passive pen, a touch pen, or an electronic pen. The following will describe an example in which an active pen is adopted as the input apparatus 2000, but embodiments according to the present disclosure are not limited thereto.

The electronic device 1000 and the input apparatus 2000 may each perform two-way communication. The electronic device 1000 may provide the input apparatus 2000 with uplink signals. For example, the uplink signals may include synchronization signals or information about the electronic device 1000, but embodiments according to the present invention are not particularly limited thereto. The input apparatus 2000 may provide the electronic device 1000 with downlink signals. The downlink signals may include synchronization signals or information about states of the input apparatus 2000. For example, the downlink signals may include coordinate information of the input apparatus 2000, battery information of the input apparatus 2000, slope information of the input apparatus 2000, and/or various information stored in the input apparatus 2000, but embodiments according to the present invention are not limited thereto.

Figure 2:
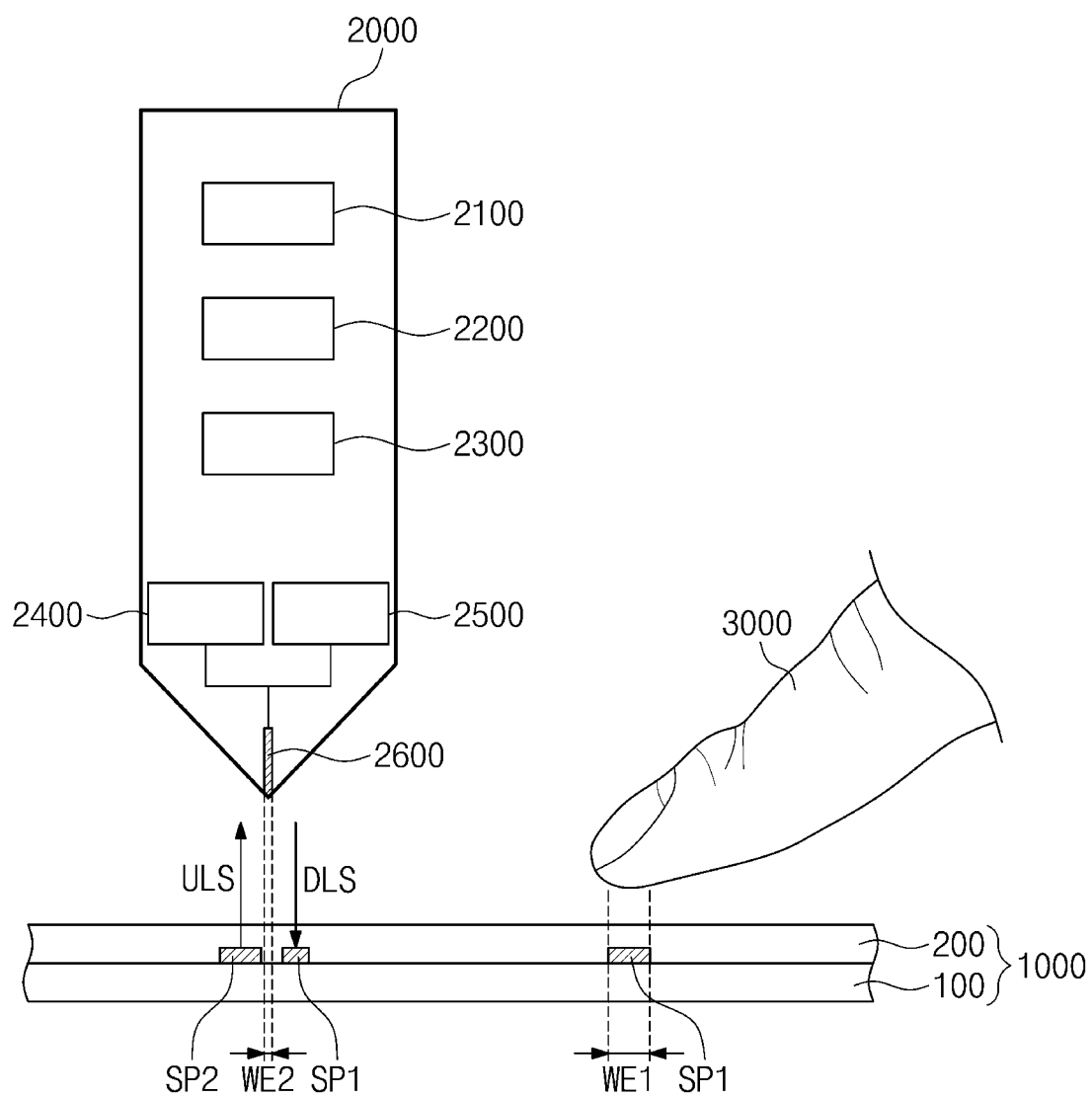
FIG. 2 illustrates a simplified block diagram showing an input apparatus and an electronic device according to some embodiments of the present invention.

FIG. 2 illustrates a simplified block diagram showing an input apparatus and an electronic device according to some embodiments of the present invention.

Referring to FIG. 2, the electronic device 1000 may include a display panel 100 and an input sensor 200.

The display panel 100 may be a component that generates or displays images. The display panel 100 may be an emissive display panel, for example, an organic light emitting display panel, a quantum dot display panel, a micro-led display panel, or a nano-led display panel.

The input sensor 200 may be located on the display panel 100. The input sensor 200 may detect an external input that is externally applied. The input sensor 200 may detect not only inputs from a user's body 3000, but also inputs from the input apparatus 2000.

An input region of a touch input from the user's body 3000 may have a first width WE1.

The input sensor 200 may operate in time-division driving method. For example, the input sensor 200 may be alternately and repeatedly driven under a first mode and a second mode. An input from the user's body 3000 may be detected in the first mode, and an input from the input apparatus 2000 may be detected in the second mode.

When the second mode begins, the input sensor 200 may provide the input apparatus 2000 with an uplink signal ULS. When the input apparatus 2000 receives the uplink signal ULS and is synchronized with the electronic device 1000, the input apparatus 2000 may provide the input sensor 200 with a downlink signal DLS.

According to some embodiments, a first sensing part SP1 of the input sensor 200 may receive the downlink signal DLS and the input from the user's body 3000, and a second sensing part SP2 of the input sensor 200 may transmit the uplink signal ULS to the input apparatus 2000. Further detailed description thereof will be discussed below.

The input apparatus 2000 may include a power source 2100, a memory 2200, a controller 2300, a transmitter 2400, a receiver 2500, and a pen electrode 2600. However, components of the input apparatus 2000 are not limited to those mentioned above. For example, the input apparatus 2000 may further include a rotation senor that detects rotation, a pressure sensor that detects pressure, an electrode switch that switches the pen electrode 2600 into a signal transmission mode or a signal reception mode, a haptic feedback component or device, or any other suitable components according to the design of the input apparatus 2000.

An input region of a touch input from the pen electrode 2600 may have a second width WE2. According to some embodiments, the second width WE2 of the input region for the pen electrode 2600 may be less than the first width WE1 of the input region for the user's body 3000.

The power source 2100 may include one of a battery and a high-capacitance capacitor each of which provides the input apparatus 2000 with power. The memory 2200 may store information about functions of the input apparatus 2000. The controller 2300 may control an operation of the input apparatus 2000. Each of the transmitter 2400 and the receiver 2500 may communicate through the pen electrode 2600 with the electronic device 1000. The transmitter 2400 may be called a signal generator or a transmission circuit, and the receiver 2500 may be called a signal receiver or a receiving circuit.

Figure 3:
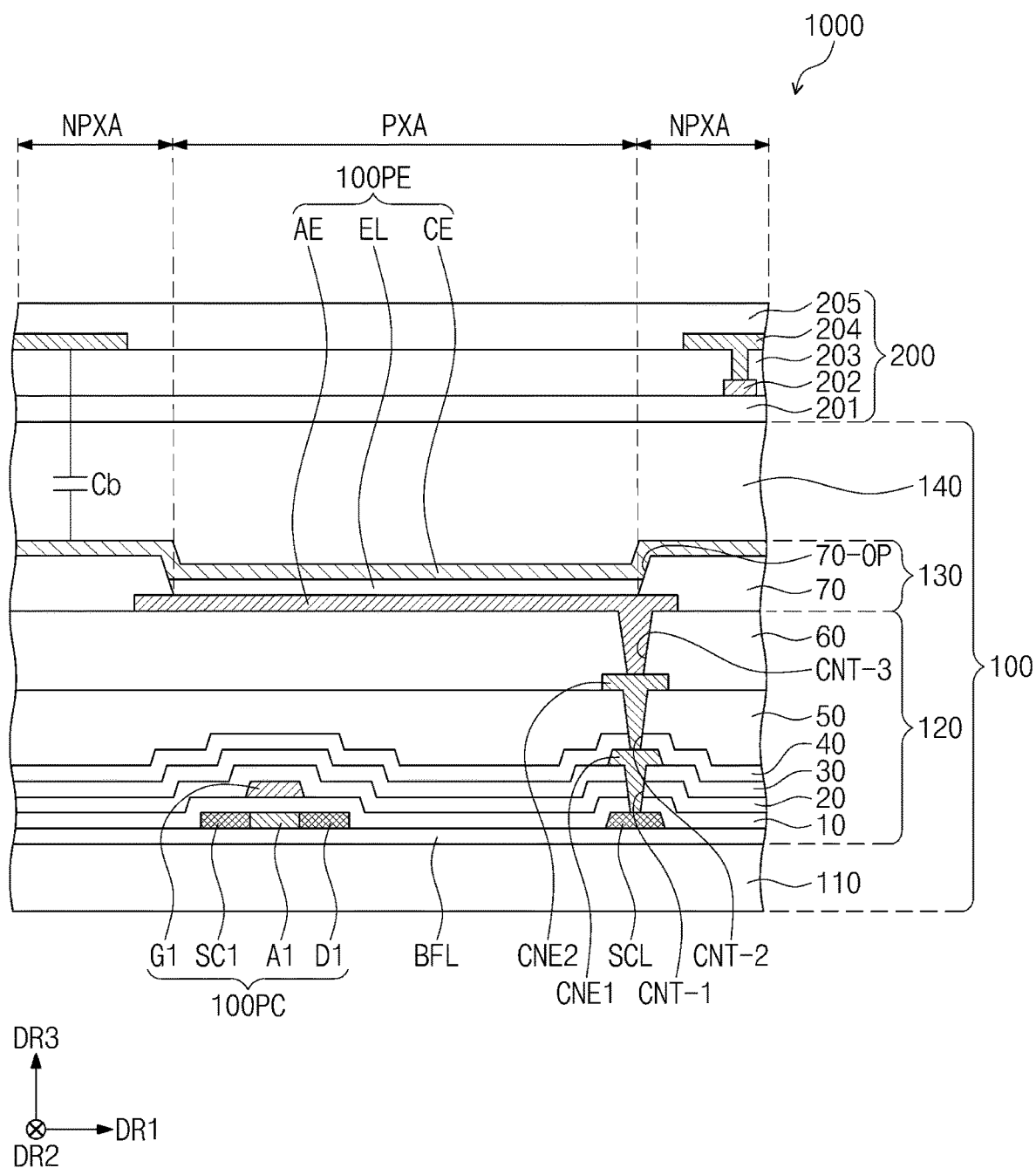
FIG. 3 illustrates a cross-sectional view showing an electronic device according to some embodiments of the present invention.

FIG. 3 illustrates a cross-sectional view showing an electronic device according to some embodiments of the present invention.

Referring to FIG. 3, the display panel 100 may include a base layer 110, a circuit layer 120, a light emitting element layer 130, and an encapsulation layer 140. For convenience of description, FIG. 3 depicts that the encapsulation layer 140 is included in the display panel 100, but the encapsulation layer 140 may be regarded as a separate component.

The base layer 110 may be a member that provides a base surface on which the circuit layer 120 is located. The base layer 110 may be a glass substrate, a metal substrate, or a polymer substrate. However, embodiments of the present invention are not limited thereto, and the base layer 110 may be an inorganic layer, an organic layer, or a composite material layer.

The base layer 110 may have a multi-layered structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be called a base barrier layer. Each of the first and second synthetic resin layers may include a polyimide-based resin. Additionally or alternatively, each of the first and second synthetic resin layers may include at least one selected from an acrylate-based resin, a methacrylate-based resin, a polyisoprene-based resin, a vinyl-based resin, an epoxy-based resin, an urethane-based resin, a cellulose-based resin, a siloxane-based resin, a polyamide-based resin, and a perylene-based resin. In this description, the language "X-based resin" may mean a resin including a functional group of X.

The circuit layer 120 may be located on the base layer 110. The circuit layer 120 may include a dielectric layer, a semiconductor pattern, a conductive pattern, a signal line, and the like. Coating and deposition processes may be employed such that a dielectric layer, a semiconductor layer, and a conductive layer are formed on the base layer 110, and then a photolithography process may be performed several times to selectively pattern the dielectric layer, the semiconductor layer, and the conductive layer. Afterwards, there may be formed the semiconductor pattern, the conductive pattern, and the signal line included in the circuit layer 120.

At least one inorganic layer may be formed on a top surface of the base layer 110. The inorganic layer may include at least one selected from aluminum oxide, titanium oxide, silicon oxide, silicon oxynitride, zirconium oxide, and hafnium oxide. The inorganic layer may be formed multi-layered. The multi-layered inorganic layers may constitute a barrier layer and/or a buffer layer. According to some embodiments, the display panel 100 is illustrated to include a buffer layer BFL.

The buffer layer BFL may increase a bonding force between the base layer 110 and the semiconductor pattern. The buffer layer BFL may include a silicon oxide layer and a silicon nitride layer, and the silicon oxide layer and the silicon nitride layer may be alternately stacked.

The semiconductor pattern may be located on the buffer layer BFL. The semiconductor pattern may include polysilicon. The present invention, however, is not limited thereto, and the semiconductor pattern may include amorphous silicon or metal oxide.

FIG. 3 merely depicts a portion of the semiconductor pattern, and the semiconductor pattern may further be located at other regions. The semiconductor pattern may be specifically arranged over pixels. The semiconductor pattern may have different electrical characteristics based on whether being doped or not. The semiconductor pattern may include a first region whose conductivity is high and a second region whose conductivity is low. The first region may be doped with n-type or p-type impurities. A P-type transistor may include a doped region implanted with P-type impurities, and an N-type transistor may include a doped region implanted with N-type impurities. The second region may be a non-doped region or may be implanted with impurities whose concentration is less than that of the impurities implanted into the first region.

The first region may have conductivity greater than that of the second region, and may substantially serve as an electrode and a signal line. The second region may substantially correspond to an active (or channel) of a transistor. For example, a portion of the semiconductor pattern may be an active of a transistor, another portion of the semiconductor pattern may be a source or drain of the transistor, and still another portion of the semiconductor pattern may be a connection electrode or a connection signal line.

Each of the pixels may have an equivalent circuit including seven transistors, one capacitor, and a light emitting element, and the equivalent circuit of the pixel may be changed into various shapes. FIG. 3 depicts by way of example a pixel including one transistor 100PC and a light emitting element 100PE.

A source SC1, an active A1, and a drain D1 of the transistor 100PC may be formed of the semiconductor pattern. When viewed in cross-section, the source SC1 and the drain D1 may extend in opposite directions from the active A1. FIG. 3 partially shows a connection signal line SCL formed of the semiconductor pattern. According to some embodiments, when viewed in a plan view, the connection signal line SCL may be electrically connected to the drain D1 of the transistor 100PC.

A first dielectric layer 10 may be formed on the buffer layer BFL. The first dielectric layer 10 may commonly overlap a plurality of pixels and may cover the semiconductor pattern. The first dielectric layer 10 may be one or more of an inorganic layer and an organic layer, and may have a single-layered or multi-layered structure. The first dielectric layer 10 may include at least one selected from aluminum oxide, titanium oxide, silicon oxide, silicon oxynitride, zirconium oxide, and hafnium oxide. According to some embodiments, the first dielectric layer 10 may be a single-layered silicon oxide layer. Likewise, the first dielectric layer 10, a dielectric layer of the circuit layer 120 may be one or more of an inorganic layer and an organic layer, and may have a single-layered or multi-layered structure. The inorganic layer may include at least one of the materials mentioned above, but embodiments according to the present invention are not limited thereto.

A gate G1 of the transistor 100PC may be located on the first dielectric layer 10. The gate G1 may be a portion of a metal pattern. The gate G1 may overlap the active A1. The gate G1 may serve as a mask when the semiconductor pattern is doped.

A second dielectric layer 20 may be located on the first dielectric layer 10 and may cover the gate G1. The second dielectric layer 20 may commonly overlap the pixels. The second dielectric layer 20 may be one or more of an inorganic layer and an organic layer, and may have a single-layered or multi-layered structure. According to some embodiments, the second dielectric layer 20 may be a single-layered silicon oxide layer.

A third dielectric layer 30 may be formed on the second dielectric layer 20, and according to some embodiments, may be a single-layered silicon oxide layer.

A first connection electrode CNE1 may be located on the third dielectric layer 30. The first connection electrode CNE1 may be coupled to the connection signal line SCL through a contact hole CNT-1 that penetrates the first, second, and third dielectric layers 10, 20, and 30.

A fourth dielectric layer 40 may be located on the third dielectric layer 30. The fourth dielectric layer 40 may be a single-layered silicon oxide layer. A fifth dielectric layer 50 may be located on the fourth dielectric layer 40. The fifth dielectric layer 50 may be an organic layer.

A second connection electrode CNE2 may be formed on the fifth dielectric layer 50. The second connection electrode CNE2 may be coupled to the first connection electrode CNE1 through a contact hole CNT-2 that penetrates the fourth and fifth dielectric layers 40 and 50.

A sixth dielectric layer 60 may be formed on the fifth dielectric layer 50 and may cover the second connection electrode CNE2. The sixth dielectric layer 60 may be an organic layer. The light emitting element layer 130 may be located on the circuit layer 120. The light emitting element layer 130 may include the light emitting element 100PE. For example, the light emitting element layer 130 may include an organic light emitting material, a quantum dot, a quantum rod, a micro-led, or a nano-led. The light emitting element 100PE may include a first electrode AE, an emission layer EL, and a second electrode CE.

The first electrode AE may be located on the sixth dielectric layer 60. The first electrode AE may be connected to the second connection electrode CNE2 through a contact hole CNT-3 that penetrates the sixth dielectric layer 60.

A pixel definition layer 70 may be located on the sixth dielectric layer 60 and may cover a portion of the first electrode AE. An opening 70-OP may be defined in the pixel definition layer 70. The opening 70-OP of the pixel definition layer 70 may expose at least a portion of the first electrode AE. According to some embodiments, a light emitting region PXA may be defined to correspond to the portion of the first electrode AE, which portion is exposed to the opening 70-OP. A non-light emitting region NPXA may surround the light emitting region PXA.

The emission layer EL may be formed on the first electrode AE. The emission layer EL may be located in the opening 70-OP. For example, the emission layer EL may be formed on each of the pixels. When a plurality of emission layers EL are formed on corresponding pixels, the emission layers EL may each emit light having at least one selected from blue, red, and green colors. The present invention, however, is not limited thereto, and the emission layer EL may be provided which is commonly connected to the pixels. In this case, the emission layer EL may provide a blue light or a white light.

The second electrode CE may be located on the emission layer EL. The second electrode CE may be formed in common on a plurality of pixels, while having a single unitary shape. The second electrode CE may be supplied with a common voltage and may be called a common electrode.

According to some embodiments, a hole control layer may be located between the first electrode AE and the emission layer EL. The hole control layer may be formed in common on the light emitting region PXA and the non-light emitting region NPXA. The hole control layer may include a hole transport layer and may further include a hole injection layer. An electrode control layer may be located between the emission layer EL and the second electrode CE. The electrode control layer may include an electrode transport layer and may further include an electrode injection layer. An open mask may be used to form the hole control layer and the electrode control layer that are commonly formed on a plurality of pixels.

The encapsulation layer 140 may be formed on the light emitting element layer 130. The encapsulation layer 140 may include an inorganic layer, an organic layer, and an inorganic layer that are sequentially stacked, but no limitation is imposed on the constituent layers of the encapsulation layer 140.

The inorganic layers may protect the light emitting element layer 130 against moisture and oxygen, and the organic layer may protect the light emitting element layer 130 against foreign substances such as dust particles. The inorganic layers may include a silicon nitride layer, a silicon oxynitride layer, a silicon oxide layer, a titanium oxide layer, or an aluminum oxide layer. The organic layer may include an acryl-based organic layer, but embodiments according to the present invention are not limited thereto.

The input sensor 200 may be formed on the display panel 100 in a successive process. In this case, it may be expressed that the input sensor 200 is directly arranged on the display panel 100. The phrase "directly arranged on" may mean that a third component is not located between the input sensor 200 and the display panel 100. For example, no adhesive member may be separately arranged between the input sensor 200 and the display panel 100. In this case, the electronic device 1000 may decrease in thickness.

The input sensor 200 may include a base dielectric layer 201, a first conductive layer 202, a sensing dielectric layer 203, a second conductive layer 204, and a cover dielectric layer 205.

The base dielectric layer 201 may be an inorganic layer including one of silicon nitride, silicon oxynitride, and silicon oxide. Alternatively, the base dielectric layer 201 may be an organic layer including an epoxy-based resin, an acryl-based resin, or an imide-based resin. The base dielectric layer 201 may have a single-layered structure or a multi-layered structure stacked along the third direction DR3.

Each of the first and second conductive layers 202 and 204 may have a single-layered structure or a multi-layered structure stacked along the third direction DR3.

The single-layered conductive layer may include a metal layer or a transparent conductive layer. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnO), or indium zinc tin oxide (IZTO). Additionally, or alternatively, the transparent conductive layer may include a metal nanowire, a graphene, or a conductive polymer such as PEDOT.

The multi-layered conductive layer may include metal layers. The metal layers may include, for example, tri-layered structure of titanium/aluminum/titanium. The multi-layered conductive layer may include at least one metal layer and at least one transparent conductive layer.

One or both of the sensing dielectric layer 203 and the cover dielectric layer 205 may include an inorganic layer. The inorganic layer may include one or more of aluminum oxide, titanium oxide, silicon oxide, silicon oxynitride, zirconium oxide, and hafnium oxide.

A parasitic capacitance Cb may occur between the input sensor 200 and the second electrode CE. A reduction in distance between the input sensor 200 and the second electrode CE may induce an increase in parasitic capacitance Cb. The parasitic capacitance Cb may increase in a structure such as that according to some embodiments of the present invention where the input sensor 200 is directly arranged on the encapsulation layer 140. For example, about 500 pF may be given as the parasitic capacitance Cb between the second electrode CE and one or more sensing electrodes of the input sensor 200. For example, the parasitic capacitance Cb between the first sensing part SP1 and the second electrode CE may be equal to or greater than about 500 pF. When the parasitic capacitance Cb is large, the occurrence of noise may be likely to increase the likelihood of creation of errors in a display panel screen.

Referring to FIGS. 2 and 3, some embodiments of the present invention may disclose the electronic device 1000 in which the first sensing part SP1 is separated from the second sensing part SP2 that provides the input apparatus 2000 with the uplink signal ULS for recognition of the input apparatus 2000. When the second sensing part SP2 and the second electrode CE are designed to have therebetween the parasitic capacitance Cb less than that between the first sensing part SP1 and the second electrode CE, it may be possible to relatively reduce noise and to prevent screen errors. For example, the parasitic capacitance Cb between the second sensing part SP2 and the second electrode CE may be equal to or greater than about 200 pF, but embodiments according to the present invention are not limited thereto.

Figure 4A:
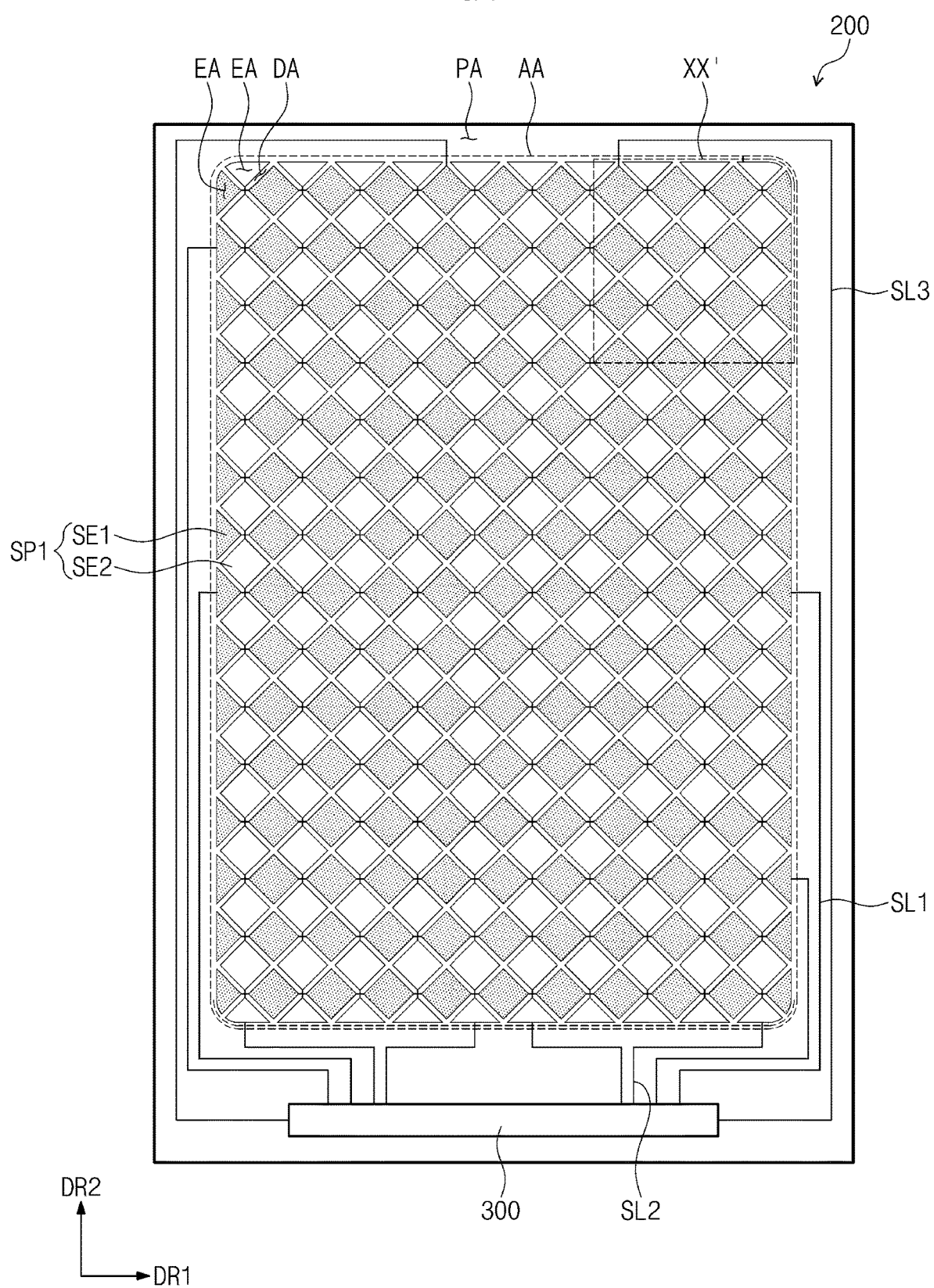

FIGS. 4A and 4B illustrate plan views showing an electronic device according to some embodiments of the present invention.

Figure 5A:
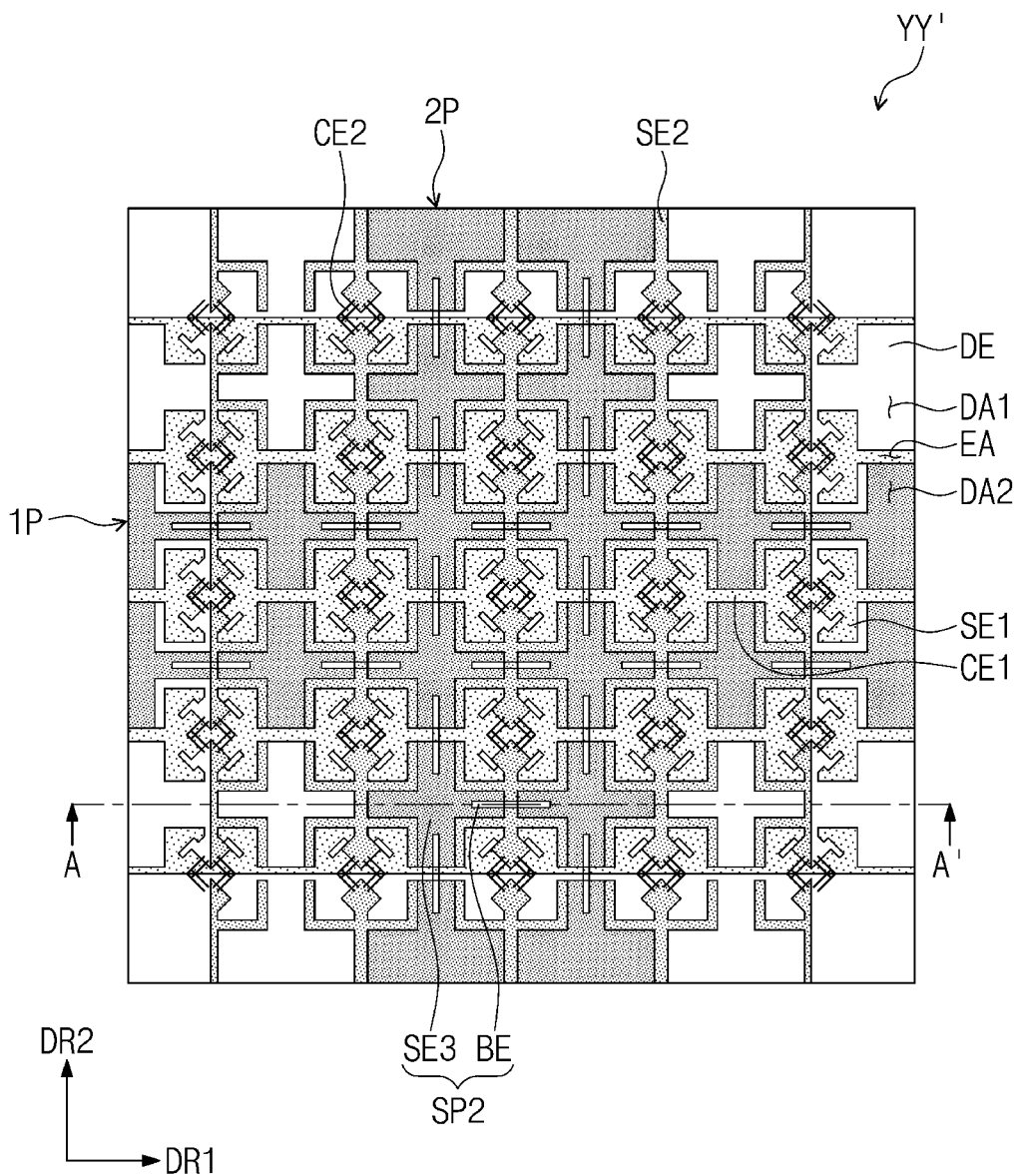
FIG. 5A illustrates an enlarged view showing the section YY' of FIG. 4B.

FIG. 4A illustrates a plan view showing the input sensor 200 according to some embodiments of the present invention. FIG. 4B illustrates a simplified enlarged plan view showing section XX' of FIG. 4A. FIG. 5A illustrates an enlarged view showing section YY' of FIG. 4B.

Referring to FIGS. 4A to 5A, the input sensor 200 may include the first sensing part SP1 that detects a first input from user's touch and a second input from the input apparatus (see element 2000 of FIG. 2), and may also include the second sensing part SP2 that recognizes the input apparatus 2000 before the detection of the second input from the input apparatus 2000.

When the second sensing part SP2 recognizes the input apparatus 2000, the input sensor 200 may operate under the second mode. During the operation under the second mode, the input sensor 200 may use the first sensing part SP1 to detect the second input from the input apparatus 2000.

According to some embodiments, the input sensor 200 may include a plurality of wiring lines and an input driving circuit 300 in addition to the first sensing part SP1 and the second sensing part SP2. The plurality of wiring lines may connect the input driving circuit 300 to the first and second sensing parts SP1 and SP2.

The input driving circuit 300 may provide the input sensor 200 with signals for detection of the first and second inputs, and may process input signals that correspond to the first and second inputs detected in the input sensor 200.

According to some embodiments, the input driving circuit 300 may apply a first signal to the first sensing part SP1 and a second signal to the second sensing part SP2. The input sensor 200 may detect the first and second inputs through the first signal applied to the first sensing part SP1. The first signal may include the downlink signal (see DLS of FIG. 2). The input sensor 200 may use the downlink signal DLS to detect the second input from the input apparatus 2000. The input sensor 200 may recognize the input apparatus 2000 through the second signal applied to the second sensing part SP2. The second signal may include the uplink signal (see ULS of FIG. 2). The input sensor 200 may provide the input apparatus 2000 with the second signal or the uplink signal ULS. When the input apparatus 2000 receives the second signal, the input apparatus 2000 may be synchronized with the input sensor 200, and may receive the downlink signal DLS from the input apparatus 2000, thereby operating under the second mode in which the second input is detected.

The first sensing part SP1 may include a first sensing electrode SE1 and a second sensing electrode SE2.

The first sensing electrode SE1 may be provided in plural, and the plurality of first sensing electrodes SE1 may be arranged in the second direction DR2. Each of the first sensing electrodes SE1 may extend in the first direction DR1 that intersects the second direction DR2. For example, each of the first sensing electrodes SE1 may include a plurality of unit electrodes that extend in the first direction DR1. The first sensing electrode SE1 may include a first connection electrode CE1. The first connection electrode CE1 may connect a plurality of unit electrodes to each other.

The second sensing electrode SE2 may be provided in plural, and the plurality of second sensing electrodes SE2 may be arranged along the first direction DR1. Each of the second sensing electrodes SE2 may extend in the second direction DR2. Each of the second sensing electrodes SE2 may include a plurality of unit electrodes that extend in the second direction DR2. The second sensing electrode SE2 may include a second connection electrode CE2. The second connection electrode CE2 may connect a plurality of unit electrodes to each other. According to some embodiments, the second connection electrode CE2 may be located on a different layer from that on which the first sensing electrode SE1, the second sensing electrode SE2, and the first connection electrode CE1 are located.

The second sensing part SP2 may include a third sensing electrode SE3 and a bridge electrode BE. The third sensing electrode SE3 may be located between two neighboring ones of the plurality of first sensing electrodes SE1. The third sensing electrode SE3 may be located between two neighboring ones of the plurality of second sensing electrodes SE2. For example, the third sensing electrode SE3 may include at least one first part 1P located between two neighboring ones of the plurality of first sensing electrodes SE1, and may also include a second part 2P located between two neighboring ones of the plurality of second sensing electrodes SE2. FIG. 5A depicts the third sensing electrode SE3 including two first parts 1P and two second parts 2P, but embodiments according to the present invention are not limited thereto. Two first parts 1P may be electrically connected to each other through the bridge electrode BE. Two second parts 2P may also be electrically connected to each other through the bridge electrode BE.

At least one first part 1P may extend in the first direction DR1 and may include a plurality of unit electrodes. At least one second part 2P may extend in the second direction DR2 and may include a plurality of unit electrodes. A plurality of bridge electrodes BE may each include a plurality of unit electrodes included in the third sensing electrode SE3. The third sensing electrode SE3 may transmit the uplink signal ULS to the input apparatus 2000.

The plurality of wiring lines may include a first wiring line SL1, a second wiring line SL2, and third wiring line SL3. The first wiring line SL1 may connect the first sensing electrode SE1 to the input driving circuit 300, the second wiring line SL2 may connect the second sensing electrode SE2 to the input driving circuit 300, and the third wiring line SL3 may connect the third sensing electrode SE3 to the input driving circuit 300.

Referring to FIGS. 4A and 4B, the first wiring line SL1 and the first sensing electrode SE1 may be connected on left and right sides in the first direction DR1 of the input sensor 200. The second wiring line SL2 and the second sensing electrode SE2 may be connected on a lower side in the second direction DR2 of the input sensor 200. In this case, the third wiring line SL3 and the third sensing electrode SE3 may be connected on an upper side in the second direction DR2 of the input sensor 200. The third wiring line SL3 may be connected to the third sensing electrode SE3 located on a second region DA which will be discussed below.

According to some embodiments, an active area AA and a peripheral area PA may be defined on the input sensor 200. The first sensing part SP1 and the second sensing part SP2 may be located at the active area AA. The plurality of wiring lines may be located at the peripheral area PA.

The active area AA may include a first region EA and a second region DA. The first sensing electrode SE1 and the second sensing electrode SE2 may be located at the first region EA. The third sensing electrode SE3 and a dummy electrode DE may be located at the second region DA. On the active area AA, the second region DA may correspond to a dummy region other than the first region EA where the first and second sensing electrodes SE1 and SE2 are located. For example, the third sensing electrode SE3 may be located at the dummy region. The third sensing electrode SE3 may replace certain dummy electrodes DE located at the second region DA or the dummy region. For example, on the second region DA, the third sensing electrode SE3 may be located at a region DA2 other than a region DA1 where the dummy electrode DE is located.

Figure 5B:
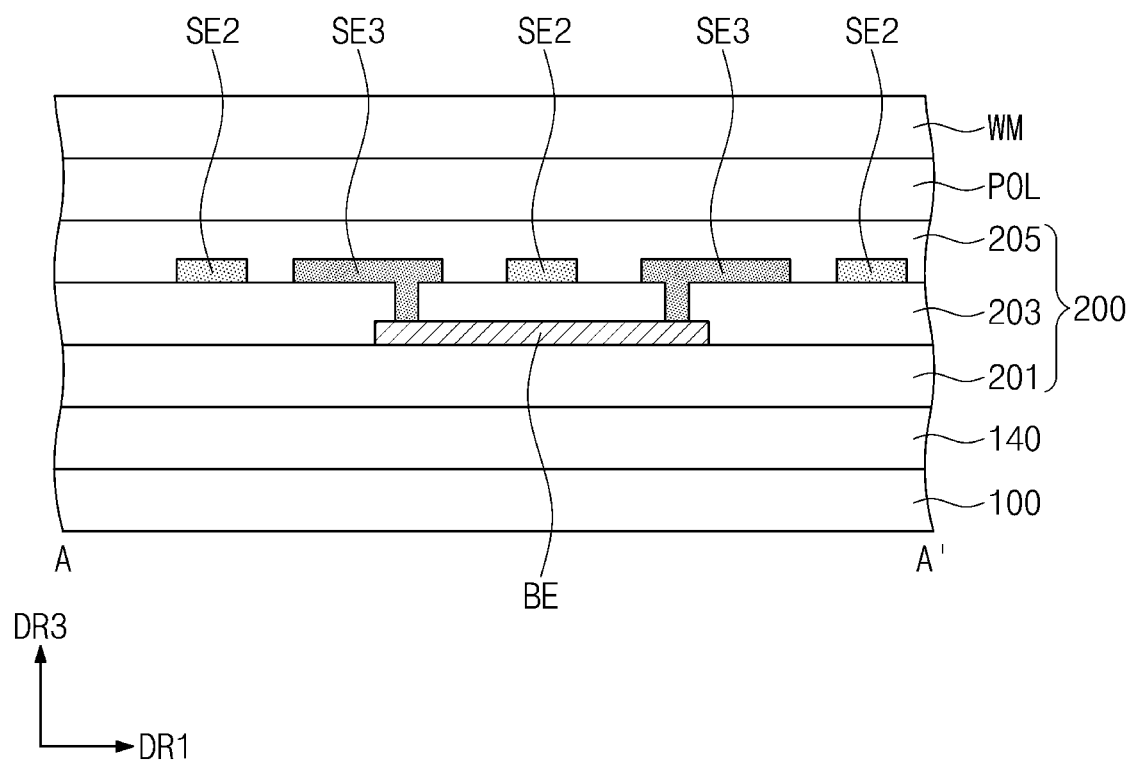
FIG. 5B illustrates a cross-sectional view taken along the line A-A' of FIG. 5A.

FIG. 5B illustrates a cross-sectional view taken along the line A-A' of FIG. 5A.

Referring to FIG. 5B, the second sensing electrode SE2 may be located on the same layer on which the third sensing electrode SE3 is located. The bridge electrode BE may be located on a different layer from that on which the third sensing electrode SE3 is located. The third sensing electrode SE3 may be connected through a contact hole CNT to the bridge electrode BE. The third sensing electrodes SE3 may be electrically connected to each other through the bridge electrode BE.

As shown in FIG. 5B, the bridge electrode BE may be located on the base dielectric layer 201. For example, the bridge electrode BE may be included in the first conductive layer (see, e.g., element 202 of FIG. 3). The second sensing electrode SE2 and the third sensing electrode SE3 may be located on the sensing dielectric layer 203 and may be included in the second conductive layer (see 204 of FIG. 3). The cover dielectric layer 205 may cover the second conductive layer 204.

The electronic device 1000 may include a polarization layer POL and a window WM as shown in FIG. 5B. The polarization layer POL may be omitted. An adhesive member may be provided between the window WM and the polarization layer POL.

Figure 6A:
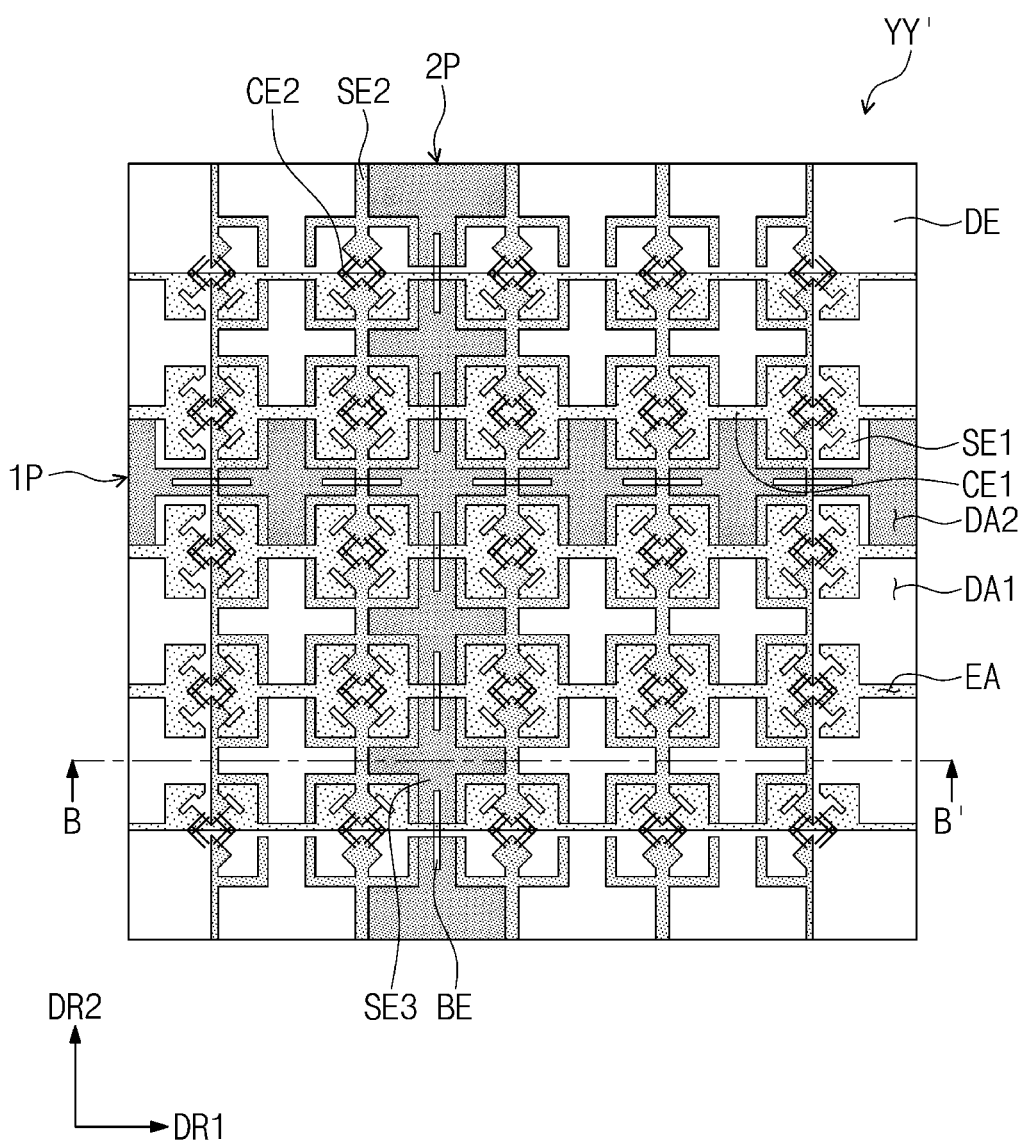
FIG. 6A illustrates a plan view showing an electronic device according to some embodiments of the present invention.
Figure 6B:
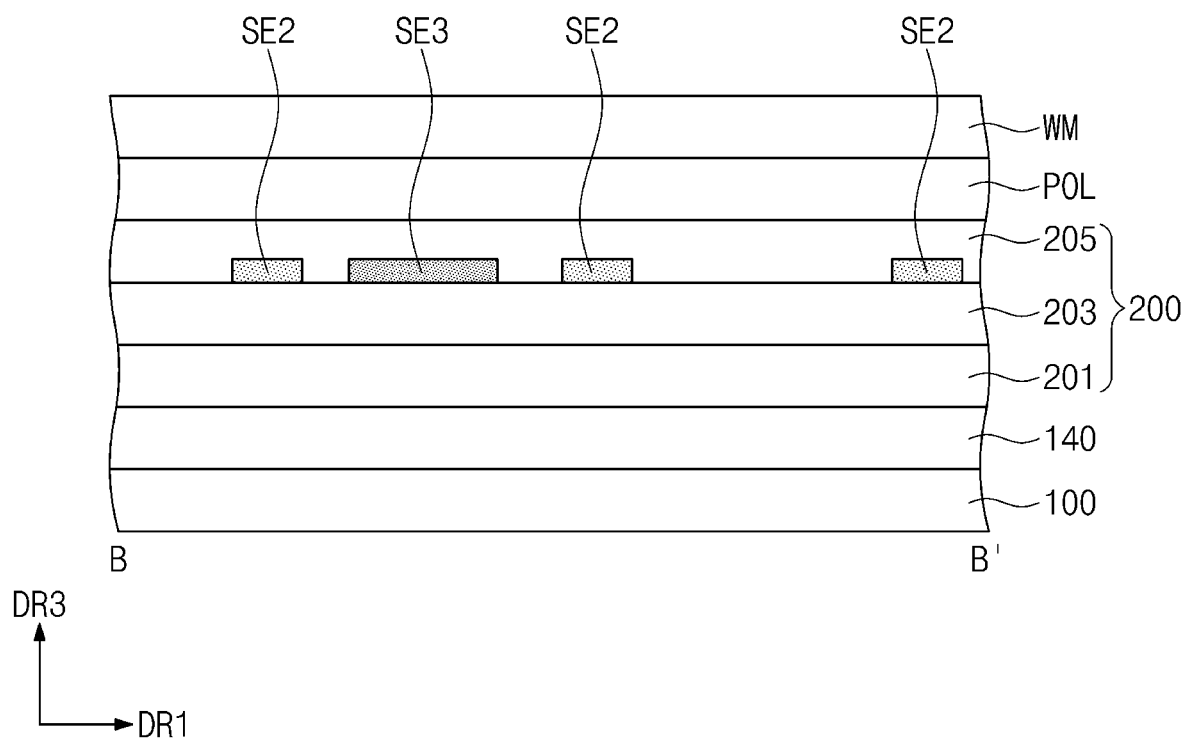
FIG. 6B illustrates a cross-sectional view taken along the line B-B' of FIG. 6A.

FIG. 6A illustrates a plan view showing an electronic device according to some embodiments of the present invention. FIG. 6B illustrates a cross-sectional view taken along the line B-B' of FIG. 6A.

FIG. 6A is an enlarged view showing section YY' of FIG. 4B. FIG. 6B is a cross-section cut along the line B-B' of FIG. 6A.

Referring to FIGS. 6A and 6B, the third sensing electrode SE3 may include a single first part 1P and a single second part 2P that intersect each other. The third sensing electrode SE3 and the second electrode (see CE of FIG. 3) may have therebetween a parasitic capacitance of equal to or less than about 200 pF. In contrast, each of the first and second sensing electrodes SE1 and SE2 and the second electrode CE may have therebetween a parasitic capacitance of equal to or greater than about 500 pF.

Figure 7:
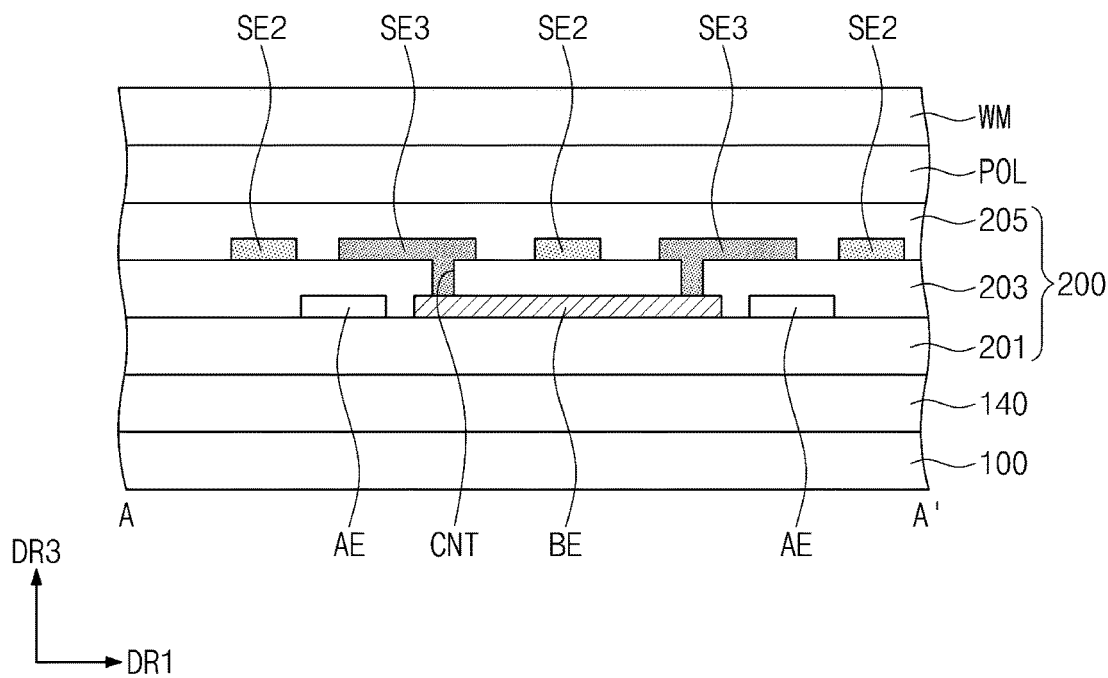
FIG. 7 illustrates a cross-sectional view showing an electronic device according to some embodiments of the present invention.

FIG. 7 illustrates a cross-sectional view showing an electronic device according to some embodiments of the present invention.

Referring to FIG. 7, the second sensing part SP2 of the input sensor 200 may include a plurality of auxiliary electrodes AE. The plurality of auxiliary electrodes AE may be located on a different layer from that on which the third sensing electrodes SE3 are located. According to some embodiments, the auxiliary electrodes AE may be located on the same layer on which the bride electrode BE is located. For example, the auxiliary electrodes AE may be located on the base dielectric layer 201.

The auxiliary electrodes AE may overlap in the third direction DR3 with the third sensing electrodes SE3.

According to some embodiments, a signal applied to the auxiliary electrodes AE may have an opposite phase to that of a signal applied to the third sensing electrodes SE3. For example, a signal of the auxiliary electrodes AE may correspond to an anti-phase signal of the third sensing electrodes SE3.

Therefore, when the second electrode (see CE of FIG. 3) is simultaneously supplied with a signal provided to the third sensing electrodes SE3 and a signal provided to the auxiliary electrodes AE, both of the signals may be counterbalanced with each other to reduce noise between the input apparatus (see 2000 of FIG. 2) and the input sensor (see 200 of FIG. 2). According to some embodiments, each of the auxiliary electrodes AE may be supplied with a ground or DC power and may thus serve as a ground.

For example, the auxiliary electrodes AE may have a role to reduce noise that occurs when the input apparatus 2000 is recognized by the uplink signal (see ULS of FIG. 2) with which the third sensing electrodes SE3 provide the input apparatus 2000.

Figure 8:
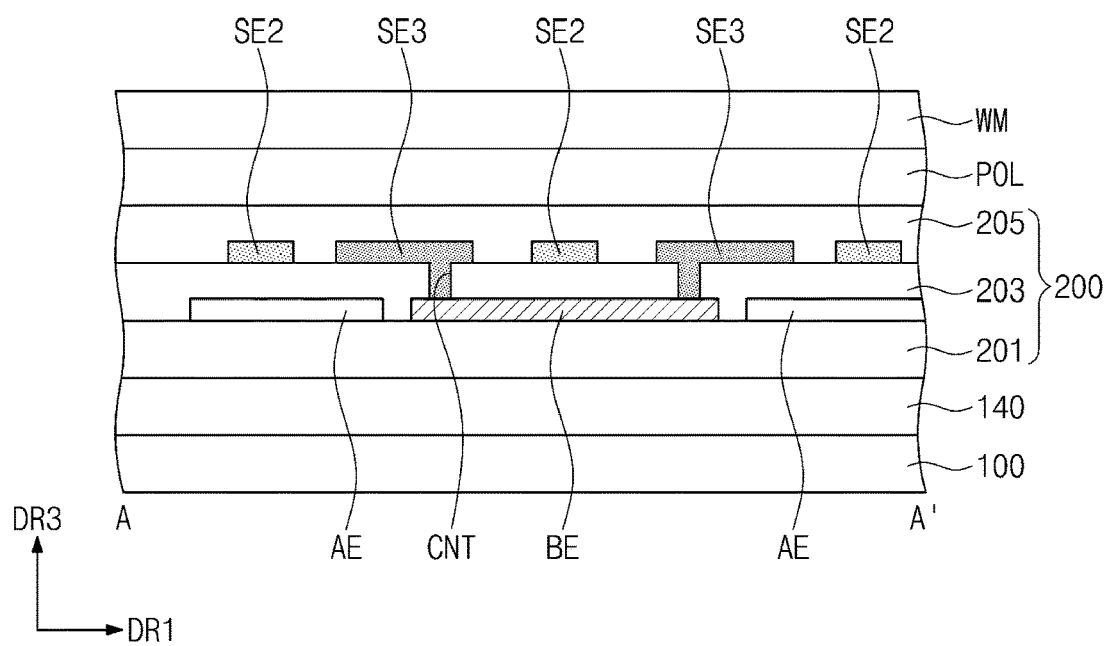
FIG. 8 illustrates a cross-sectional view showing an electronic device according to some embodiments of the present invention.

FIG. 8 illustrates a cross-sectional view showing an electronic device according to some embodiments of the present invention.

Referring to FIG. 8, the auxiliary electrodes AE may be arranged to overlap not only the third sensing electrodes SE3, but also the second sensing electrodes SE2 (and/or, the first sensing electrodes SE1).

According to some embodiments, because the auxiliary electrodes AE are arranged to overlap not only the third sensing electrodes SE3 but also the first and second sensing electrodes SE1 and SE2, it may be possible to reduce noise that occurs when the input sensor 200 uses the first and second sensing electrodes SE1 and SE2 to detect an external input.

Figure 9:
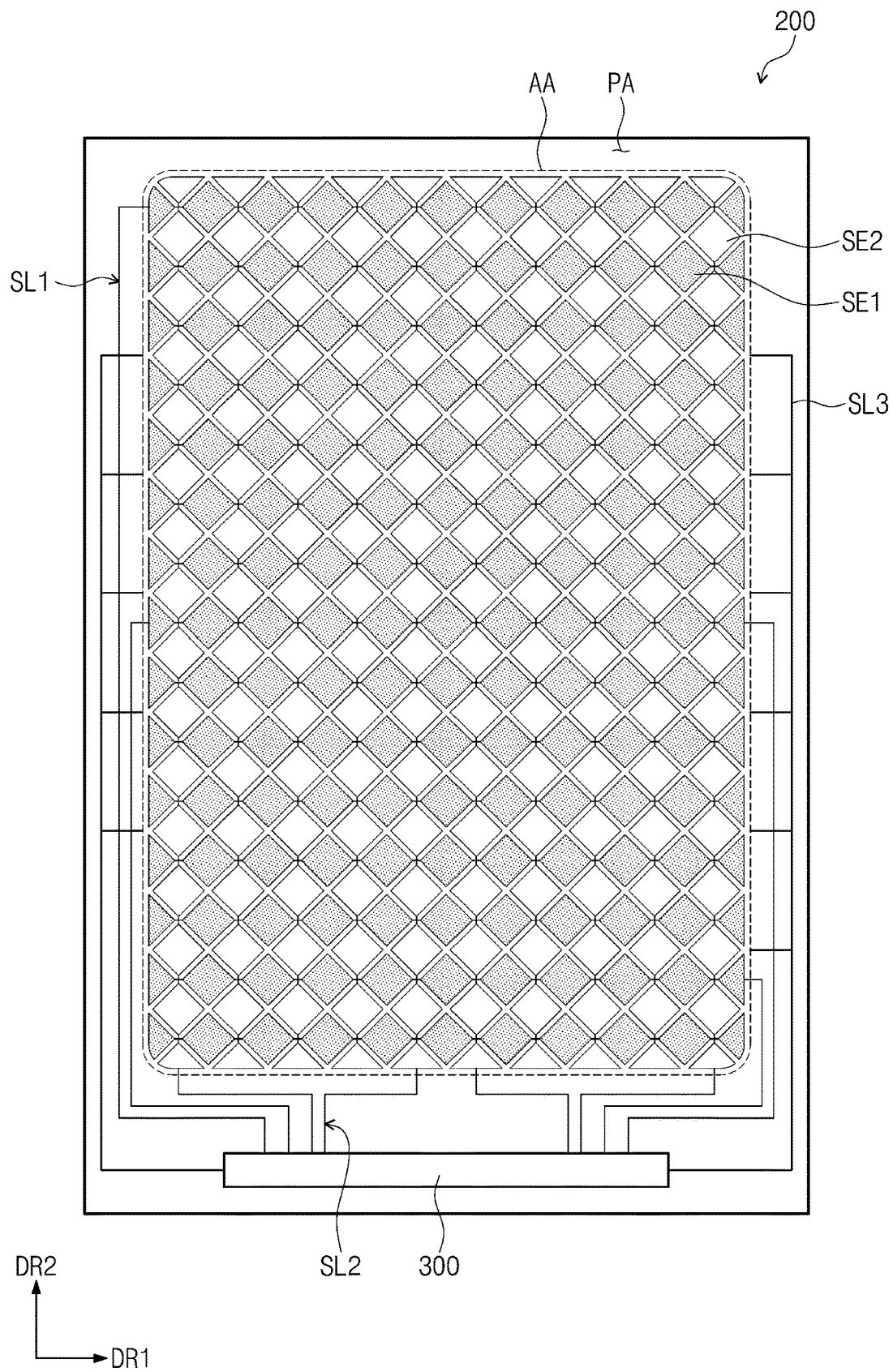
FIGS. 9 and 10 illustrate plan views showing an electronic device according to some embodiments of the present invention.
Figure 10:
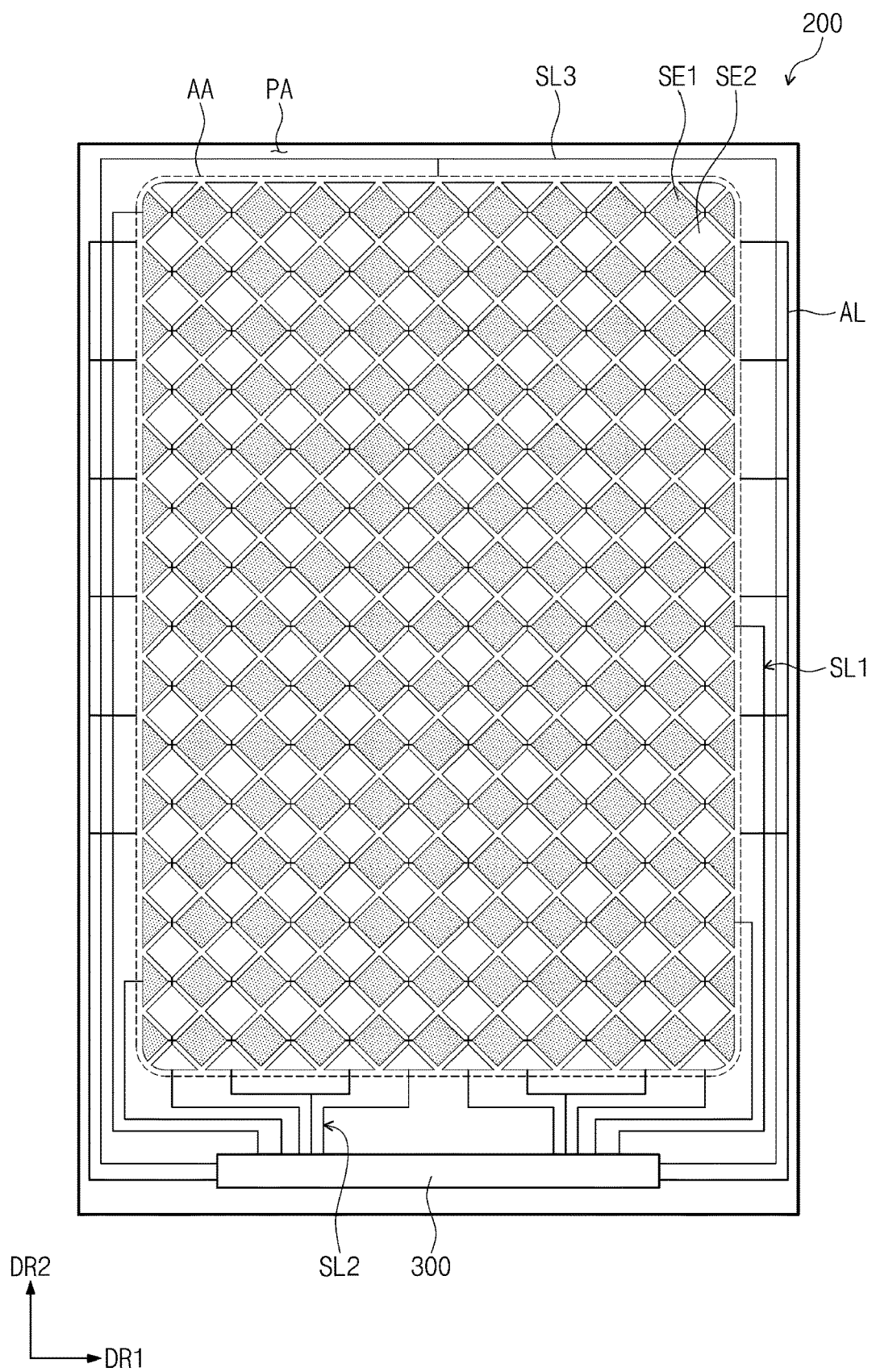

FIGS. 9 and 10 illustrate plan views showing an electronic device according to some embodiments of the present invention. FIGS. 9 and 10 show a plurality of wiring lines according to some embodiments of the present invention.

Referring to FIG. 9, the first wiring line SL1 and the first sensing electrode SE1 may be connected on left and right sides in the first direction DR1 of the input sensor 200, and likewise, the third wiring line SL3 and the third sensing electrode (see SE3 of FIG. 5A) may be connected on left and right sides in the first direction DR1. The second wiring line SL2 and the second sensing electrode SE2 may be connected on a lower side in the second direction DR2 of the input sensor 200.

Referring to FIG. 10, the input sensor 200 may include a plurality of auxiliary wiring lines AL connected to the auxiliary electrodes (see AE of FIG. 7). The auxiliary wiring lines AL and the auxiliary electrodes AE may be connected on left and right sides in the first direction DR1 of the input sensor 200. According to some embodiments, the auxiliary wiring lines AL and the auxiliary electrodes AE may be connected on an upper or lower side in the second direction DR2 of the input sensor 200.

According to the present invention, a sensing electrode for an active pen may be provided separately from a touch sensing electrode, and thus it may be possible to increase touch sensitivity and to reduce any noise resulting from the use of the active pen.

Some embodiments have been described in the specification and drawings. Although specific terms are used herein, they are merely used for the purpose of describing the present invention rather than limiting technical meanings or scopes of the present invention disclosed in the claims. Therefore, it will be appreciated by a person of ordinary skill in the art that various modifications and equivalent embodiments can be made from the present invention. In conclusion, the authentic technical scope of embodiments according to the present invention to be protected shall be determined by the technical concepts of the accompanying claims, and their equivalents.

What is claimed is:

1. An electronic device, comprising:
 a display panel; and
 an input sensor on the display panel, wherein the input sensor is configured to operate in a first mode during which the input sensor detects a first input from a user's touch or in a second mode during which the input sensor detects a second input from an input apparatus,
 wherein the input sensor includes:
 a first sensing part configured to detect the first input and the second input; and
 a second sensing part configured to recognize the input apparatus,
 wherein the first sensing part includes:
 a plurality of first sensing electrodes arranged along a first direction and extending in a second direction intersecting the first direction; and a plurality of second sensing electrodes arranged along the second direction and extending in the first direction, wherein the second sensing part includes:
a plurality of third sensing electrodes between two neighboring ones of the plurality of first sensing electrodes and between two neighboring ones of the plurality of second sensing electrodes.

2. The electronic device of claim 1, wherein the input sensor is configured to operate in the second mode in response to the second sensing part recognizing the input apparatus.

3. The electronic device of claim 1, wherein the input sensor further includes an input driving circuit configured to provide the first sensing part with a first signal to detect the first input or the second input and configured to provide the second sensing part with a second signal to recognize the input apparatus.

4. The electronic device of claim 3, wherein the input sensor is configured to transmit the second signal to the input apparatus, the second signal being as an uplink signal.

5. The electronic device of claim 3, wherein the first signal includes a downlink signal which is received from the input apparatus to detect the second input.

6. The electronic device of claim 1, wherein the second sensing part includes:
a plurality of bridge electrodes connecting the plurality of third sensing electrodes to each other.

7. The electronic device of claim 6, wherein the input sensor includes:
an active area where the first and second sensing parts are located; and
a peripheral area adjacent to the active area and where a plurality of wiring lines are located,
wherein the active area includes:
a first region where the first sensing electrodes and the second sensing electrodes are located; and
a second region adjacent to the first region and where a plurality of dummy electrodes are located.

8. The electronic device of claim 7, wherein the third sensing electrodes are on a part of the second region, the part of the second region being where none of the dummy electrodes are located.

9. The electronic device of claim 6, wherein
the first sensing electrode, the second sensing electrode, and the third sensing electrode are on a same layer, and
the bridge electrodes are on a layer different from the layer on which the first, second, and third sensing electrodes are located.

10. The electronic device of claim 6, wherein the second sensing part further includes a plurality of auxiliary electrodes overlapping the third sensing electrodes and on a same layer on which the bridge electrodes are located.

11. The electronic device of claim 10, wherein the input sensor is configured to provide the plurality of auxiliary electrodes with a signal whose phase is opposite to a phase of a signal applied to the third sensing electrodes.

12. The electronic device of claim 10, wherein the plurality of auxiliary electrodes overlap not only the third sensing electrodes but also at least one of the first sensing electrodes or the second sensing electrodes.

13. The electronic device of claim 10, wherein the input sensor further includes a plurality of auxiliary wiring lines connecting the auxiliary electrodes to an input driving circuit.

14. The electronic device of claim 6, wherein the input sensor further includes:
a first wiring line connected to the first sensing electrode;
a second wiring line connected to the second sensing electrode; and
a third wiring line connected to the third sensing electrode.

15. An electronic device, comprising:
a display panel; and
an input sensor on the display panel, the input sensor including a sensing region and a dummy region adjacent to the sensing region, the sensing region including a first sensing part, and the dummy region including a second sensing part,
wherein the first sensing part includes a first sensing electrode and a second sensing electrode configured to receive a first signal to detect an input from an input apparatus or a user's touch,
wherein the second sensing part includes a third sensing electrode configured to receive a second signal to recognize the input apparatus,
wherein the first sensing electrode and the second sensing electrode intersect each other on a plane, and
wherein the third sensing electrode is adjacent to the first sensing electrode and the second sensing electrode,
wherein
the first sensing electrode is provided in plural, wherein the plurality of first sensing electrodes extend in a first direction,
the second sensing electrode is provided in plural, wherein the plurality of second sensing electrodes extend in a second direction, and
the third sensing electrode is provided in plural, wherein each of the plurality of third sensing electrodes is between two neighboring ones of the plurality of first sensing electrodes and between two neighboring ones of the plurality of second sensing electrodes.

16. The electronic device of claim 15, wherein the input sensor is configured to operate in a first mode to detect a first input from the user's touch or in a second mode to detect a second input from the input apparatus,
wherein the second mode is activated in response to the input apparatus being recognized by the second signal of the third sensing electrode.

17. The electronic device of claim 15, wherein the second sensing part further includes a bridge electrode on a layer different from a layer on which the third sensing electrode is located.

18. The electronic device of claim 17, wherein the input sensor further includes an auxiliary electrode overlapping at least the third sensing electrode and which is on the same layer on which the bridge electrode is located.

* * * * *